US008180883B1

(12) United States Patent
Clemm et al.

(10) Patent No.: US 8,180,883 B1
(45) Date of Patent: May 15, 2012

(54) METHOD AND SYSTEM FOR PROCESSING DIRECTIVES INCLUDED IN MANAGEMENT EVENTS (75) Inventors: Ludwig Alexander Clemm, Los Gatos, CA (US); Cosmin Dini, San Jose, CA (US); Petre Dini, San Jose, CA (US); Manuela Popescu, Greenville, DE (US)

(73) Assignee: Cisco Technology, Inc., San Jose, CA (US)

( * ) Notice: Subject to any disclaimer, the term of this patent is extended or adjusted under 35 U.S.C. 154(b) by 1401 days.

(21) Appl. No.: 10/910,459

(22) Filed: Aug. 2, 2004

(51) Int. Cl.
G06F 15/173 (2006.01)
(52) U.S. Cl. ............. 709/224; 709/223; 718/1; 718/100
(58) Field of Classification Search .................. 709/224, 709/223; 718/1, 100
See application file for complete search history.

(56) References Cited

U.S. PATENT DOCUMENTS

| | | | |
|---|---|---|---|
| 5,414,704 A | 5/1995 | Spinney | |
| 5,488,412 A | 1/1996 | Majeti et al. | |
| 5,506,987 A | 4/1996 | Abramson et al. | |
| 5,566,337 A * | 10/1996 | Szymanski et al. | 710/260 |
| 5,586,121 A | 12/1996 | Moura et al. | |
| RE35,774 E | 4/1998 | Moura et al. | |
| 5,774,668 A | 6/1998 | Choquier et al. | |
| 5,818,845 A | 10/1998 | Moura et al. | |
| 5,828,655 A | 10/1998 | Moura et al. | |
| 5,859,852 A | 1/1999 | Moura et al. | |
| 5,872,773 A | 2/1999 | Katzela et al. | |
| 5,872,966 A * | 2/1999 | Burg | 719/313 |
| 5,881,315 A * | 3/1999 | Cohen | 710/52 |
| 5,892,903 A | 4/1999 | Klaus | |
| 5,946,047 A | 8/1999 | Levan | |
| 5,946,048 A | 8/1999 | Levan | |
| 5,953,335 A | 9/1999 | Erimli et al. | |
| 5,953,375 A | 9/1999 | Nishiwaki et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,969,705 A * | 10/1999 | Fisher et al. | 715/764 |
| 5,989,060 A | 11/1999 | Coile et al. | |
| 6,006,266 A | 12/1999 | Murphy et al. | |
| 6,016,388 A | 1/2000 | Dillon | |
| 6,052,718 A | 4/2000 | Gifford | |
| 6,092,178 A | 7/2000 | Jindal et al. | |
| 6,101,543 A | 8/2000 | Alden et al. | |
| 6,212,190 B1 | 4/2001 | Mulligan | |
| 6,260,070 B1 | 7/2001 | Shah | |

(Continued)

OTHER PUBLICATIONS

C. Lonvick, The BSD syslog Protocol, Aug. 2001 (RFC 3164).*

(Continued)

*Primary Examiner* — David Lazaro
*Assistant Examiner* — Waseem Ashraf
(74) *Attorney, Agent, or Firm* — Stolowitz Ford Cowger LLP (57) ABSTRACT

A method and system for processing directives included in management events are disclosed. A method for handling management events includes detecting an event generated upon an occurrence relating to a device, such as a network device. The device related occurrence has a characteristic. A directive, appropriate to this characteristic, is included with the event format. The event is directed to a management entity, which interprets the directive and handles the event by processing it according to the directive. Such preprocessing directives included in the events allow recipients of the events to decide what to do with them, e.g., with the messages therein, and thus help prevent inadvertent loss of information conveyed in these events.

21 Claims, 8 Drawing Sheets

U.S. PATENT DOCUMENTS

| | | | |
|---|---|---|---|
| 6,345,294 | B1 | 2/2002 | O'Toole et al. |
| 6,446,121 | B1 | 9/2002 | Shah et al. |
| 6,446,134 | B1 * | 9/2002 | Nakamura .................... 719/313 |
| 6,477,522 | B1 | 11/2002 | Young |
| 6,505,254 | B1 | 1/2003 | Johnson |
| 6,522,651 | B2 | 2/2003 | Herrmann |
| 6,542,468 | B1 | 4/2003 | Hatakeyama |
| 6,577,863 | B2 * | 6/2003 | Bourlas et al. ................ 455/424 |
| 6,606,643 | B1 | 8/2003 | Emens et al. |
| 6,795,858 | B1 | 9/2004 | Jain et al. |
| 6,810,411 | B1 | 10/2004 | Coughlin et al. |
| 6,856,991 | B1 | 2/2005 | Srivastava |
| 6,931,446 | B1 | 8/2005 | Cox et al. ...................... 709/227 |
| 6,961,766 | B2 * | 11/2005 | Janosik et al. ................ 709/224 |
| 6,986,076 | B1 * | 1/2006 | Smith et al. ........................ 714/4 |
| 6,993,784 | B1 * | 1/2006 | Shinotsuka ..................... 725/74 |
| 7,051,097 | B1 | 5/2006 | Pecina ............................ 709/224 |
| 7,062,562 | B1 | 6/2006 | Baker ............................ 709/227 |
| 7,072,979 | B1 | 7/2006 | Aviani et al. |
| 7,085,224 | B1 * | 8/2006 | Oran .............................. 370/216 |
| 7,130,901 | B2 * | 10/2006 | Roach ........................... 709/224 |
| 7,136,916 | B2 * | 11/2006 | Schade .......................... 709/223 |
| 7,149,771 | B1 | 12/2006 | Gifford |
| 7,213,016 | B1 * | 5/2007 | Barmakian ........................ 707/3 |
| 7,230,924 | B2 * | 6/2007 | Chiu et al. .................... 370/237 |
| 7,331,049 | B1 * | 2/2008 | Jin ................................. 719/314 |
| 7,349,960 | B1 | 3/2008 | Pothier et al. ................. 709/224 |
| 2001/0013130 | A1 * | 8/2001 | Shimizu et al. ................ 725/91 |
| 2002/0016867 | A1 * | 2/2002 | Kampe et al. ................. 709/318 |
| 2002/0111161 | A1 * | 8/2002 | Bourlas et al. ................ 455/423 |
| 2002/0150093 | A1 * | 10/2002 | Ott et al. ....................... 370/389 |
| 2002/0156836 | A1 * | 10/2002 | Janosik et al. ................ 709/203 |
| 2002/0186658 | A1 * | 12/2002 | Chiu et al. .................... 370/237 |
| 2003/0012129 | A1 * | 1/2003 | Lee et al. ...................... 370/216 |
| 2003/0131143 | A1 * | 7/2003 | Myers ........................... 709/318 |
| 2003/0172151 | A1 * | 9/2003 | Schade .......................... 709/224 |
| 2003/0225883 | A1 * | 12/2003 | Greaves et al. ............... 709/224 |
| 2004/0042402 | A1 * | 3/2004 | Galand et al. ................. 370/237 |
| 2004/0078457 | A1 * | 4/2004 | Tindal ........................... 709/223 |
| 2004/0267924 | A1 * | 12/2004 | Yang et al. .................... 709/223 |
| 2005/0240796 | A1 * | 10/2005 | Dziong et al. ..................... 714/2 |
| 2005/0288903 | A1 * | 12/2005 | Jackson et al. ................ 702/187 |
| 2006/0069788 | A1 * | 3/2006 | Blackmore et al. ........... 709/230 |
| 2007/0097874 | A1 * | 5/2007 | Hughes et al. ................ 370/252 |

OTHER PUBLICATIONS

RFC 3164, The BSD SysLog Protoco, Aug. 2001I.*
Digital Island, Inc. -e-Business Without Limits-, "Enabling Technologies," http://www.digisle.net. No date.
Internap, "Preferred Collocation Services," http://www.internap.com Copyright .COPYRGT. 2001 Internap Network Services Corporation.
Mockapetris, P., Request for Comments No. 1034, entitled, "Domain Names—Concepts and Facilities," Nov. 1987, Internet Engineering Task Force.
Information Sciences Institute, Request for Comments No. 793, entitled, "Transmission Control Protocol—DARPA Internet Program—Protocol Specification," Sep. 1981, Internet Engineering Task Force.
Lu et al., "Automatic Network Addresses Assignment and Translation Interference," U.S. Appl. No. 60/160,535, filed Oct. 20, 1999.
Lu et al., "Method and Apparatus for Automatic Network Address Assignment," U.S. Appl. No. 60/178,063, filed Jan. 24, 2000.
Johnson et al., "Method and Apparatus for Determining a Network Topology in the Presence of Network Address Translation," U.S. Appl. No. 60/178,062, filed Jan. 24, 2000.
Toole et al., "Fast-Changing Network Status and Load Monitoring and Feedback," U.S. Appl. No. 60/177,985, filed Jan. 25, 2000.
Stolowitz Ford Cowger LLP, Listing of Related Cases, Oct. 13, 2009.
Meyer, et al., "Generic Routing Encapsulation (GRE)," Jan. 2000, Internet Engineering Task Force, 9 pages.

* cited by examiner

PRE-PROCESSING DIRECTIVE HEADER FIELD    500

BOOLEAN SUB-FIELD    501
"1 = 'keep_informal' / 0 = contra"

BOOLEAN SUB-FIELD    502
"1 = 'fast_track' / 0 = contra"

STRING SUB-FIELD    503
VALUES: "none",
    "every_x_minutes" (where 'x' is variable);
    "every_<day_of_the_week" /
    <"months & date_of_the_year>";
    "under-command" (e.g. special cancellation command to clear a particular event)

METHOD AND SYSTEM FOR PROCESSING DIRECTIVES INCLUDED IN MANAGEMENT EVENTS

TECHNICAL FIELD

The present invention relates generally to the field of network management. More specifically, embodiments of the present invention relate to a method and system for processing directives included in management events.

BACKGROUND

Networks for linking computer and communication systems have become important to many modern enterprises and service providers. Networks have become widespread and standards and protocols have been developed and widely adopted for their management. Careful management promotes networking efficiency, reliability, and manageability. Large modern networks link many network devices, such as routers and switches, and have complex topologies and other operational features to deliver complex services. To be successful, management approaches and related systems must deal with the size and complexity of networks.

Among the protocols developed for managing networks are the Simple Network Management Protocol (SNMP) and the System Log (Syslog) protocol. The Syslog protocol provides a transport mechanism for promulgating event log messages across networks, including Internet Protocol (IP) based networks. Syslog servers receive such event log messages in a Syslog based and managed network and become Syslog event collectors. Syslog events are typically sent on many different occasions, including at the start or termination of a process, when unexpected changes occur, or when certain communication related events occur.

Such processes include for instance actions of a network device, the function of an operating system (OS) therein, the function of an application therein, and the like. Logs generated by the OSs and network devices provide a record of activity of these devices, which can be useful for statistical and other informational purposes, as well as for management, e.g., backup and recovery, such as from device crashes, failures, network outages, etc. Such logs are typically written by a network device's OS or another control program, according to the purpose intended by the device vendor or OS developer.

Logs can record a variety of data relating to a network device. Such data can include, for example, error and status messages, certain network transaction details, incoming dialogs, and start/stop activities of certain routines. With respect to system logs as relate to the Syslog protocol, their content format may be standardized under the Universal Logging Protocol (ULP).

Syslog events relate to such logs. Error logs, for instance, can record the date and time of occurrence for an error event affecting a server of the Syslog based network. The corresponding event would identify the server, describe a particular component locus for the error, classify the type of error, provide a code for the severity of the error, for instance as it relates to continuing component device and/or network operation and reliability, and a message body descriptive of the error. Syslog events comprise a few well defined fields with the purpose of event processing, and a message typically describing Syslog reports used for network management. Messages are usually in a plain English, human readable form.

Such messages reflect the interest of network management and operating entities in obtaining accurate and in-time information relating to the status of network devices. These management entities base their management functions such as network administration, at least in part, on such Syslog events. Some such network administration functions, for instance billing, can demand a high degree of precision and consistency, including differential processing of Syslog events according to their relevance.

However, inconsistencies have occurred in billing and other network administrative and other management functions based on such Syslog events. Such inconsistencies can become problematic for some network providers and other network management and operating entities. For instance, inconsistencies can occur in a network provider's billing system related to Syslog reports, and such inconsistencies can result in billing disputes, which may be particularly likely to arise following outages and other periods characterized by suboptimal network performance and/or availability. Two factors to which such Syslog event based inconsistencies can be attributed include delay in processing Syslog events and information loss therefrom.

Given the size and complexity of modern networks, as well as the large amount of traffic and various modes of operation thereon, network devices such as routers, servers and switches can have significantly high activity levels. Syslog based networks may generate an extraordinarily large volume of logs and related Syslog events.

Some delays in processing Syslog events have been attributed to time used to perform event processing through an Internet Operational Support System (OSS). The time for performing event processing through an OSS can vary and may become significant for business purposes.

For instance, without a specific instruction or other impetus for the OSS to expedite a particular Syslog report, for instance one having a heightened criticality relative to other processing tasks, the OSS may possibly delay processing that Syslog events report for those other processing tasks (e.g., based on other priorities, perhaps not as significant).

Some information loss from Syslog reports has been attributed to excessive processing of Syslog event messages, including the overwriting of data thereon. Overwriting data on an original Syslog report typically occurs in processing related to handling that report, such as to classify an event to which the Syslog report relates (e.g., to mark the report for special subsequent handling). Some such overwriting of original Syslog report data can be attributed to efforts at efficient management processing taken to cope with the veritable flood of Syslog events that can characterize a modern network, for instance, a large, complex and heavily trafficked one.

Efforts at efficient management processing taken to cope with this flood have included aggressive filtering, aggregation, abstraction, and data distillation (which are typically achieved by discarding information). However, inadvertent loss of important information has occurred from Syslog events through such aggressive processing. For instance, where an OSS systems integrator or application developer aggressively processes a Syslog event, it may do so with imperfect (e.g., acontextual) realization of a particular significance of the carried message, or perhaps of a certain piece of information therein.

Without a specific instruction or other impetus for the OSS to process Syslog events' messages without corrupting data therein, problems can arise. One example relates to an original Syslog event, which provided an accurate description of the status of a particular network device. This exemplary Syslog event was then processed by a user's OSS components for special handling (e.g., to avoid its early clearing, so as to preserve the report for an audit). In so handling the original Syslog event, the accurate descriptive data relating to the status of that particular network device was overwritten, leading to erroneous status indication for the network device. The inconsistencies could have led to a billing dispute.

Issues contributing to such management problems in processing Syslog events include the partial correlation between Syslog events and SNMP informs/traps performed at a component level of a NMS, and processing tasks such as parsing, correlation, and the like, with which the Syslog events are processed. Considering the first issue, defining SNMP notifications, such as traps and informs, follows a structured information model (SMI). A network device may send management related information, including SNMP informs or Syslog events, through a Syslog interface and/or an SNMP interface. Through each interface, these data respectively report the same behavior, for instance, the same fault causes, the same performance violations, etc. Related conversion and filtering processes can inadvertently lose information conveyed by Syslog events.

With multiple interfaces operating, it can be important to combine and correlate events reporting status that come from either or both interfaces. One conventional solution is to identify the set of Syslog events corresponding to a formally identified SNMP notification. However, such operations typically drop some information reported by Syslog events, which corresponds to the data loss discussed above. Additionally, the time required to execute these conventional processing and other operations can be produce reporting delays and cause delays in providing feedback to the devices, important for its management.

Further, as an extremely large number of Syslog events may typically be issued in some networks, differentiating among them can become important. Such differentiating between the myriad Syslog events allows for applying appropriate correlation mechanisms, saving management resources (e.g., processing, memory, power use, etc.) needed to process them, and timely reporting for a particularly identified cause (e.g., of the event).

Conventionally, such differentiation is performed with filtering Syslog events based on well defined fields or with local semantics of parsed plain English text. However, filters for achieving this differentiation are typically defined according to a management application target. Thus, a particular guideline coming from the device that originated the Syslog event, for instance one significant to the device or its network by its design or character, can be obfuscated, lost, or potentially neglected.

Due in part to their great number, Syslog events are typically not passed on directly to users. Instead, processing with various network management applications is generally required. It is an automated application that ultimately decides which information is passed on to users and which is not. In some conventional applications, the application not only decides which information is passed on to users, but even which information should be logged and preserved, as much information will simply be thrown away and not be kept at all.

Such automation can inadvertently eliminate and thus lose information from a Syslog event. For instance, some conventional applications tend to discard information that they do not understand or that has not been explicitly declared important to the application. Thus, while conventional applications may take proper action on information that they know to be important, they are not aggressive, e.g., they are not conservative on the side of information that they do not understand. Some such applications typically err on the side of throwing out too much rather than too little information.

Syslog notifications typically allow specification of event significance, e.g., the severity of an underlying actual event from the perspective of network operations, management, etc. However, for conventional network management applications, severity does not provide a sole, suitable criterion as to whether a Syslog event should be reported. For instance, a particular message may be redundant and/or subjected to filtering activities.

Delay conventionally expected or imposed in considering a Syslog event for processing can exceed a particular time period significant in guaranteeing the accuracy of the reported cause/state, within an interval needed for appropriate feedback or other corresponding action. The conventional ease with which Syslog events define free form format events can complicate their correlation with SNMP notifications. This can cause significant information conveyed by a Syslog event, intended for instance for action by a human operator, to be lost when Syslog aggregation, Syslog to SNMP notification translations, Syslog to SNMP correlation, or other processing functions are performed.

Thus, while a dense and rich amount of significant information may originally be captured by a Syslog event, this information can be lost, destroyed, or delayed from timely reporting, due to aggregation, translation, correlation, and/or other management processes. This can be particularly troublesome when information relating to temporary/transient faults is to be captured in a Syslog event. Where the original information in such a Syslog event is lost, the actual device/network-related event manifestation is not longer visible, e.g., no longer occurring, on account of its transience or temporary nature; yet its effect on network management may have been significant. Thus, the loss of its Syslog data can extinguish its records, which can lead to management related issues, such as administrative disputes, financial consequences, and the like.

Thus, delay in processing Syslog events and information loss therefrom can pose significant and problematic challenges in efficiently and reliably managing a network. Concomitant failure to provide timely response to critical Syslog reports can be inefficient and can have significant consequences in promoting network reliability, such as where they relate to device inoperability, link availability, and/or network outages. Data loss from Syslog events can lead to inconsistencies, which can be problematic for network administration and other network management functions.

There are cases where Syslog events must be processed and conveyed with particular care in order to avoid delays in reporting significant underlying actual network events and to help keep management delays reasonable, for instance, to allow for timely feedback actions. Conventional Syslog events are not processed by network management entities based on the relevance of the event itself and on particular processing needs.

Syslog events are used to convey information relating to a wide variety of network occurrences. The size and complexity of networks can lead to potentially overwhelming volumes of Syslog events. Conventional management applications attempt to handle this volume by filtering, correlation, preprocessing, and/or other processes. However, important Syslog events can be inadvertently and unrecoverably lost in these processes. Sometimes, such Syslog events are so lost because process developers are unaware of the significance of certain messages relating to the Syslog events.

SUMMARY

A method and system for processing directives included in management events are disclosed. In one embodiment, a method for directing processing related handling for an event message comprises generating the event message upon occurrence of an event relating to a device, such as a network device. The device related event has a characteristic. A directive, appropriate to this characteristic is included with the event. The event is directed to a management entity, which interprets the directive and handles the event by processing it according to the directive. Such preprocessing directives included in the events allow recipients of the events to decide what to do with them, e.g., with the messages therein, and thus help prevent inadvertent loss of information (e.g., perhaps critical information) conveyed in these events.

In one embodiment, the event message substantially complies with a System Log (Syslog) protocol and comprises, for instance, a Syslog event. In one embodiment, interpreting the directive comprises reading the directive and generating an appropriate policy for controlling the handling of the event. A policy, for instance, can comprise an action appropriately corresponding to the characteristic of the device related occurrence. The policy is directed to an application of the management entity, which handles the event according to the policy; this policy captures the business function, unknown to a device that issues a Syslog event.

In one embodiment, the directive is included in the text of the event message, and the directive can be read, e.g., when the text is parsed. In another embodiment, the directive comprises a header field, which can include multiple subfields, such as Boolean and string subfields. In this alternate embodiment, the Syslog message does not have to be parsed to read the directive. The Boolean subfield can comprise semantics relating to preferentially processing the event message based on an indication of the event relating to the device. The event can thus be handled according to these semantics. The string subfield can comprise values relating to cancellation of processing relating to the event message. Such cancellation can efficiently clear the event message, for instance, after passage of a pre-determined time.

DETAILED DESCRIPTION

A method and system for processing directives included in management events are disclosed. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known methods, processes, algorithms, procedures, network topologies, systems, components, and circuits have not been described in detail so as not to unnecessarily obscure aspects of the present invention.

Portions of the detailed description that follows are presented and discussed in terms of a process. Although steps and sequencing thereof are disclosed in figures herein (e.g., FIGS. 7 and 8) describing the operations of this processes (e.g., processes 700 and 800, respectively), such steps and sequencing are exemplary. Embodiments of the present invention are well suited to performing various other steps or variations of the steps recited in the flowcharts of the figures herein, and in a sequence other than that depicted and described herein. In one embodiment, such processes are carried out by processors and electrical and electronic components under the control of computer readable and computer executable instructions comprising code contained in a computer usable medium.

Embodiments of the present invention provide a method and system for processing directives included in management events. The event has a recommended processing characteristic. A directive, appropriate to this characteristic, is included with the event message. The event is directed to a management entity, which interprets the directive and handles the event by processing it according to the directive.

Therefore, delay in processing events relating to occurrences relating to network devices, such as System Log (Syslog) events, and information loss therefrom, which can pose significant and problematic challenges to efficient and reliable network management can be avoided. This allows timely and efficient processing of such events and appropriate response to significant events, feedback actions, and minimizing management related processing delays. Further, such timely and efficient handling promotes economy of processing, memory, and networking resources.

Exemplary Network Environment

Figure 1:
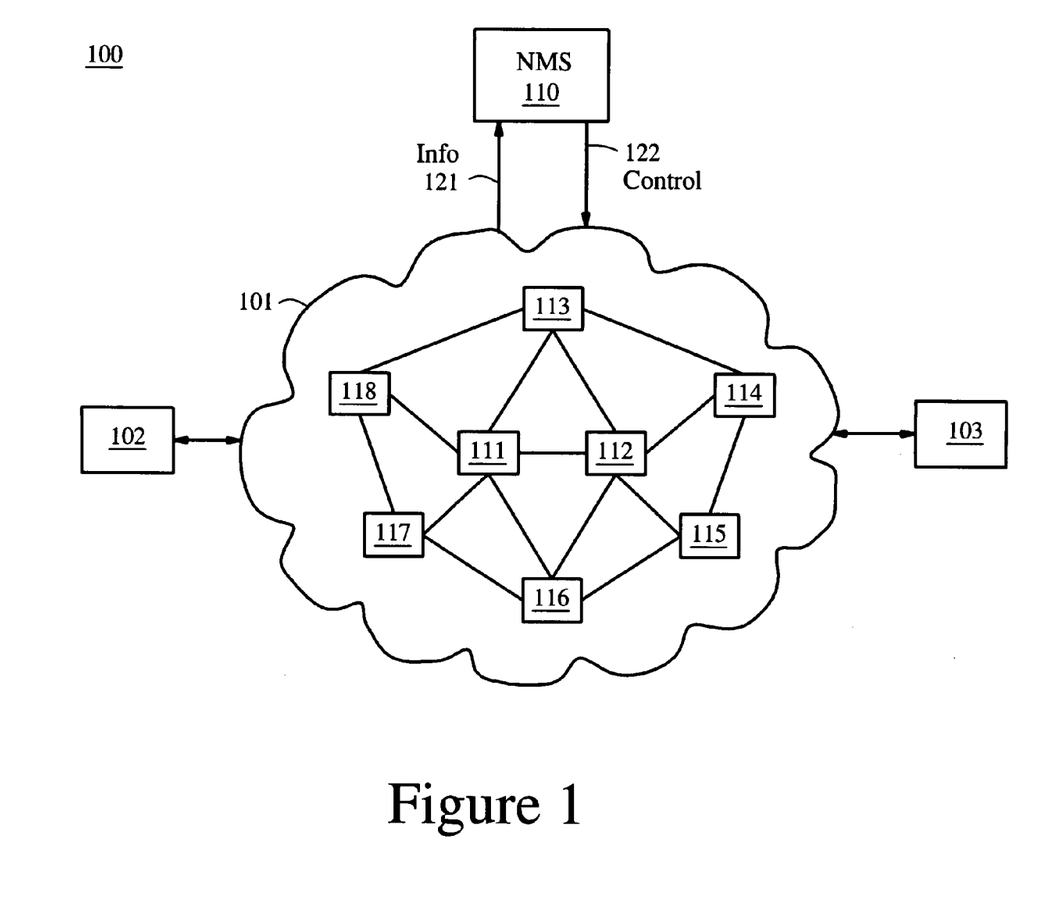
FIG. 1 depicts an exemplary network, according to one embodiment of the present invention.

FIG. 1 depicts an exemplary network environment 100, according to one embodiment of the present invention. Within network environment 100, a network 101 communicatively couples a computer, communication system, or other entity 102 with another of such entities 103. In one embodiment, network 101 comprises a modern communications network and has a complex topology 105 interlinking a plurality of network devices. Such network devices can include routers, switches, hubs, and other devices, which function to allow information to flow through network 101 by an orderly route.

A network management system (NMS) 110 monitors information 121 relating to network 101. NMS 110 processes information 121 for informational and statistical purposes, as well as to render network management decisions, such as implementing various network pathway routing policies, billing and other administrative functions relating to network information 121, and the like. NMS 110 manages network 101 with control instructions 122, in one embodiment, responsive to its processing of network information 121.

Each of the devices comprising network 101 can be linked to at least one other such device. The devices comprising network 101 include exemplary devices 111-118, which can be linked as depicted and/or in another configuration. These devices can comprise nodes of the network 101. Traffic flows from entity 102 to entity 103 through network 101 by any number of possible routes, selected according to a variety of criteria and comprising various links between several of the devices 111-118. The functioning of each of the devices 111-118 thus corresponds to activity of network 101.

Data relating to the functioning of the network devices 111-118 can thus correspond to data relating to the operation (e.g., activity, availability, capacity, speed, etc.) of network 101. For instance, data relating to the operability of network device 113, such as that the device (e.g., a router) is currently inoperable can provide information relating to route and node availability for network 101. Information 121 comprises accurate and in-time information relating to the status of network devices 111-118, such that NMS 110 can provide efficient and reliable management for network 101.

In the current example, consider entity 102 placing data into network 101 for transmission to entity 103 using device 118 as a network entry node and device 114 as an exit node. Under some routing control criterion in effect, e.g., Quality of Service (QoS), link type, Shortest Pathway First (SPF), etc., network 101 would typically route this kind of data from entry node 118, through device 113, to the exit node 114. An outage affecting device 113 can render that device unavailable for data transfer. Data relating to this outage is sent via network information 121 to NMS 110.

Processing the data relating to the outage of device 113, NMS 110 can provide controlling instructions 122 back to network 101, e.g., to devices 118, 111, and 112. Controlling instructions 122 can, for instance, program devices 118, 111, and 112 to re-route data from entity 102 for entity 103. With such re-routing, data entering network 101 from entity 102 at device 118 and bound for entity 103 are sent from device 118 to device 111, which relays them to device 112, which sends them to device 114, which remains its exit node. Upon NMS 110 processing subsequent network information 121, for instance that device 113 is restored to full availability, new corresponding controlling instructions 122 can re-program devices 111 and 113 to resume the typical routing pathway for traffic between entity 102 and 103.

Exemplary Data Structures

Figure 2:
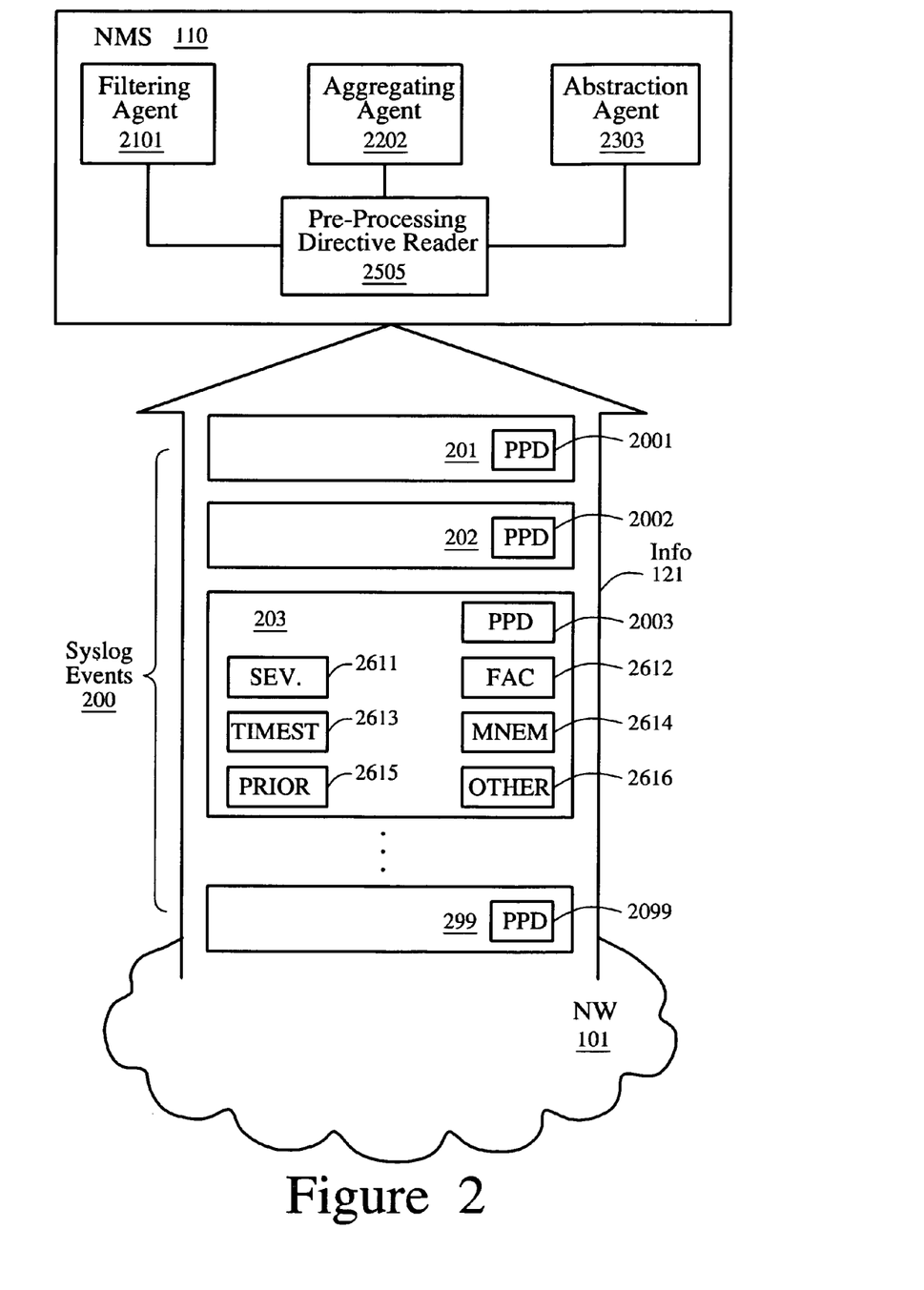
FIG. 2 depicts exemplary network information, according to one embodiment of the present invention.

FIG. 2 depicts exemplary network information 121, according to one embodiment of the present invention. Network information 121 flows from the devices comprising network 101 (e.g., devices 111-118) to NMS 110 as a stream of System Log (Syslog) events 200. In modern, large, and complex networks, stream of Syslog events 200 can be quite numerous. For purposes of illustration herein, the stream of Syslog events comprising network information 121 include Syslog events 201-299 (it is appreciated however that the actual number of Syslog events reported in such modern networks can be orders of magnitude larger).

Each of the Syslog events 201-299 may comprise information different from the other events. Some of the events 201-299 can have more significance than others for NMS 110, for instance in timely performing an important management function for network 101. For instance, where Syslog event 201 relates to the availability of a sole network entry node for a significant network client, that event may be considered significant (e.g., important or otherwise noteworthy), relative to another Syslog event.

Continuing with this example, Syslog 202 here may relate to simple device information. Such information can, for instance, comprise data that a particular network device has switched from a normal power source A to another normal power source B, such as to perform routine maintenance on power source A, with no interruption of availability, threat of same, or even heightened concern for the operability or the availability of that device. In this example, Syslog event 201 is more significant to efficient and reliable network management than Syslog event 202.

In one embodiment, more significant (e.g., critical) Syslog events, such as Syslog event 201, are preserved by recognition of their importance, notwithstanding the flood of Syslog events 200 that NWS 100 may deal with. In handling this flood without undue demands on its system resources (processing, memory, etc.) NMS 110 processes Syslog events 201-299 for processing efficiency. To achieve processing efficiency, NMS 110 may engage in filtering, aggregation, and/or abstraction, with filtering agent 2101, aggregation agent 2202, and abstraction agent 2303. However NMS 110 so processes Syslog events 200-199, for instance even where NMS engages in aggressive filtering, information significant to network management within Syslog events 200 is advantageously preserved.

In one embodiment, more significant (e.g., critical) Syslog events, such as Syslog event 201, are preserved by recognition of their importance, notwithstanding the flood of Syslog events 200 that NWS 100 may deal with. In handling this flood without undue demands on its system resources (processing, memory, etc.) NMS 110 processes Syslog events 201-299 for processing efficiency. To achieve processing efficiency, NMS 110 may engage in filtering, aggregation, and/or abstraction, with filtering agent 2101, aggregation agent 2202, and abstraction agent 2303. However NMS 110 processes Syslog events 200-299, for instance even where NMS engages in aggressive filtering, so that information significant to network management within Syslog events 200 is advantageously preserved.

In one embodiment, each of Syslog events 201-299 includes a preprocessing directive 2001-2099, respectively, which are read by a preprocessing directive reader 2505 of NMS 110, which controls the respective operations of filtering agent 2101, aggregation agent 2202, and abstraction agent 2303. Thus, these preprocessing directives 2001-2099 give direction to applications that filter and aggregate information from Syslog events 201-299, while avoiding the accidental dropping of critical information. Exemplary preprocessing directive 2001, for instance, directs NMS 110 to preserve Syslog event 201 in full (e.g., subject Syslog event 201 to no filtering, aggregation, or abstraction), as it contains particularly critical information, e.g., relating to the availability of a network entry node, as discussed above.

Figure 5:
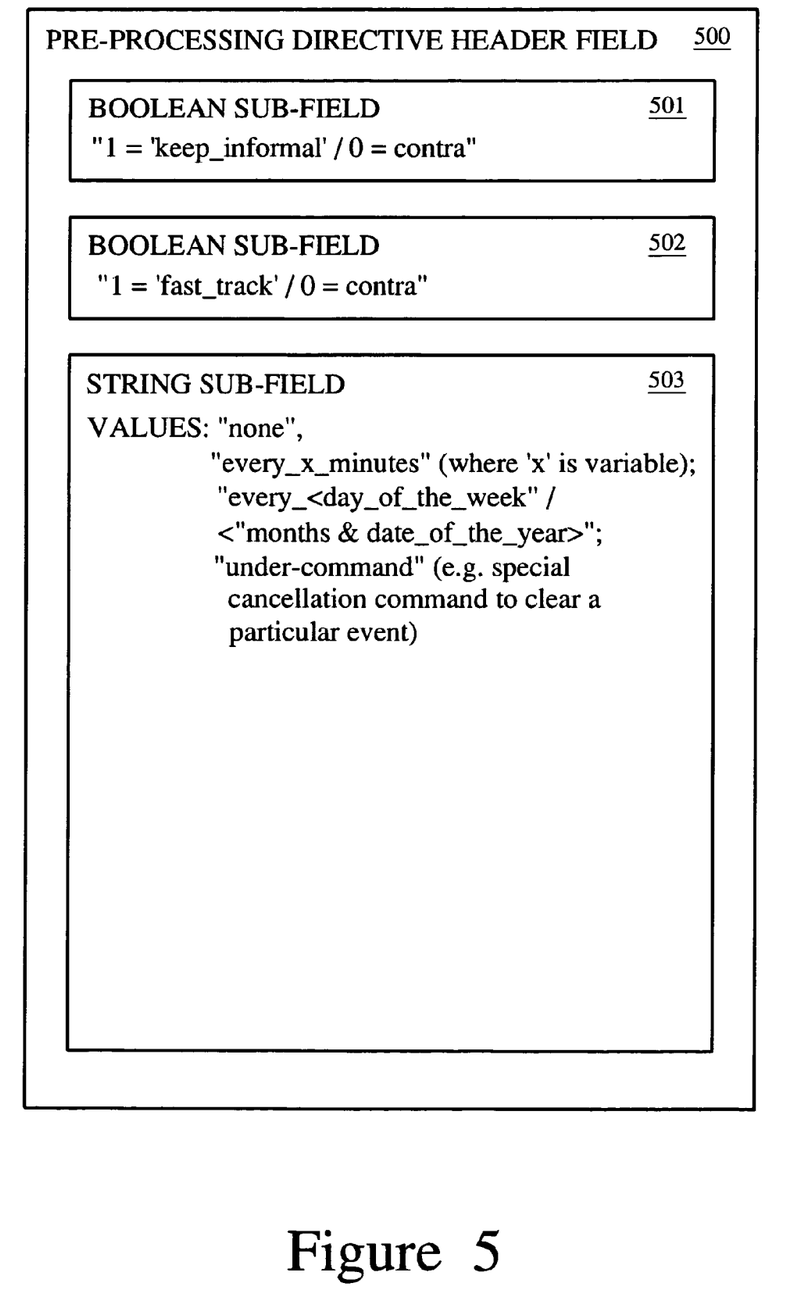
FIG. 5 depicts an exemplary preprocessing directive header field, according to one embodiment of the present invention.

The preprocessing directives 2001-2099 are applied to their respective Syslog events 201-299 at the event source (e.g., network devices 111-118; FIG. 1) or, in one embodiment, at various intermediary processing layers (e.g., layer 502; FIG. 5), for Syslog events that must be treated preferentially. The preprocessing directives 2001-2099 provide information indicative of the criticality of their respective Syslog events. For instance, the preprocessing directives provide source-defined special indications relating to aspects of criticality of their respective Syslog events.

Advantageously, this helps render achievable even various time intensive processing for certain Syslog event types. Thus, efficient feedback action may be possible, appropriate for a particular Syslog event. Although a network device serving as a reporting resource may lack control over NMS 110, e.g., over a processing component of an Internet Operational Support System (OSS), the preprocessing directives 2001-2099 provide that component with the source-defined criticality indicators for their corresponding Syslog event. Although the reporting resource may lack control over the processing component of NMS 110, preprocessing directives 2001-2099 provides a source-defined indication to that component of the criticality of their corresponding Syslog event. That processing component can function responsively to such an indication.

In one embodiment, Syslog events 201-299 are tailored to comprise a free-form text message 2602, together with some well-defined header fields 2610, as depicted with Syslog event 203. Header fields 2610 provide specific data relating to severity, facility, timestamp, mnemonic, priority, and other factors in fields 2611-2616, respectively.

In one embodiment, Syslog events 201-299 comprise code that is functional in a Unix environment. In one embodiment, Syslog events 201-299 comprise code that is functional with network devices, applications, and protocols, as well, such as Internet Operating System (IOS™) code. In one embodiment, the preprocessing directives 2001-2099 provide to their respective Syslog event messages 201-299 data that can be considered analogous to a differentiated services (DS) byte, such as specify quality of service (QoS) demands for classifying packets and assigning them an optimal connection.

Preprocessing directives 2001-2099 comprise an information element added to their respective Syslog notifications 201-299, which in one embodiment, comprises substantially text, as emitted by a network device. Preprocessing directive reader 2505 interprets this information element such that it provides preprocessing direction (e.g., instruction) to applications 2101-2303 and other applications. This direction allows an application to interpret whether or not the Syslog notification should be treated in a special way. Applications that can process the directive are correspondingly able to follow the policy conveyed therein.

Advantageously, the present embodiment is backward compatible with existing and legacy network management applications. For instance, such existing or legacy applications will not break, fail, or malfunction upon encountering preprocessing directives such as preprocessing directives 2001-2099, nor will they mishandle them. Rather, such existing or legacy applications can selectively ignore the directive. Further, the present embodiment is extensible, such that additional preprocessing directives can be developed for Syslog events.

Figure 3:
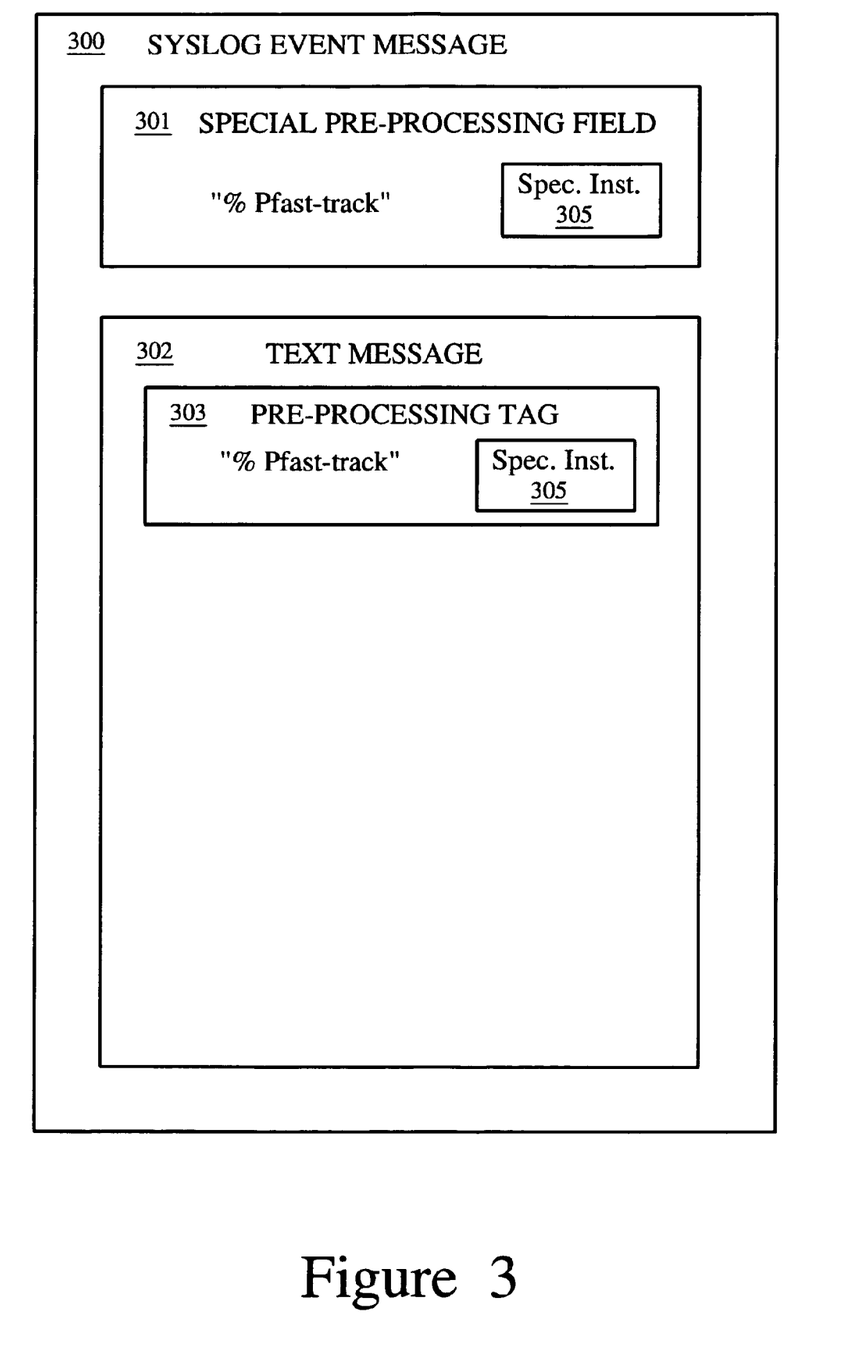
FIG. 3 depicts an exemplary Syslog event, according to embodiments of the present invention.

FIG. 3 depicts an exemplary Syslog event 300, according to embodiments of the present invention. Syslog event 300 comprises a text based message 302 and a general preprocessing directive mechanism. In one embodiment, the preprocessing directive mechanism comprises a special preprocessing field 301. In another embodiment, the preprocessing directive mechanism comprises a preprocessing tag 303 within the text message part 302 of the Syslog event 300.

The term "% Pfast_track" represents exemplary Syslog parlance wherein "% P" indicates that a preprocessing directive follows, and "fast_track" is the mnemonic of a particular directive with a semantic the meaning of which is apparent to those skilled in the art (also explainable, e.g., in an engineering document) as demanding expedited handling, e.g., to minimize reporting delay. To provide the functionality of preprocessing directive 300, the term "% Pfast_track" occurs at the beginning of the text comprising message part 302. Alternatively, the term appears within special preprocessing field 301.

In the present embodiments, where a Syslog message has no term such as "% P . . . " (e.g., "% Pfast_track" or another preprocessing related representative term), in a header 301, where so implemented, or the first token in the message part 302, the message lacks a preprocessing directive, which means that the Syslog event has no particular associated preprocessing requirement.

The preprocessing directive comprising preprocessing field 301 and/or tag 303 can relate to any preprocessing preference, requirement, etc. that may be significant to a network management system, for instance, to ensure that a Syslog event is not delayed or that information is not deleted therefrom in processing. Exemplary Syslog preprocessing directives are &cussed below. However, the present embodiment is extensible to include other directives not discussed herein. The preprocessing directive mechanism described by reference to exemplary preprocessing directives 301 and 302 (and e.g., preprocessing directives 2001-2099; FIG. 2) is generic and extensible.

It should be appreciated that the following examples are presented to describe exemplary preprocessing directives and expressly do not limit an embodiment of the present invention to these directives. Preprocessing directives conveyed by preprocessing field 301 and/or tag 303 may include special instructions 305. Examples of such instructions include 'Do not filter', 'Do not filter and maintain', 'Expedite processing', and event type-appropriate notifications.

Where special instruction 305 conveys "Do not filter" semantics, a corresponding response may be determined by a particular network management application, as to how Syslog event 300 is actually handled. However, these semantics tell the network management application that, "when in doubt, keep this information and pass it on to an end user." Conveying "Do not filter" semantics, special instruction 305 thus effectively corresponds to the "fast_track" field described above (e.g., "% Pfast_track"). Advantageously, such "Do not filter" semantics, conveyed by special instruction 305, can help prevent delay in handling a Syslog event 300.

The semantics conveyed by a "Do not filter and maintain" special instruction 305 are, in one sense, somewhat stronger. These "Do not filter and maintain" semantics conveyed by special instruction 305 tell the network management application that, "not only keep this information, but archive this information." The semantics conveyed by a "Expedite processing" special instruction 305 tell the network management application to "pass on the information in this Syslog event immediately upon receipt and without delay," and possibly, to "pass this Syslog event on before others that are ahead of it in the queue."

A preprocessing directive conveyed by special instruction 305 may refer to the "type" of notification its particular Syslog event comprises and instruct a network management application on appropriate corresponding treatment for that type of notification. A particular network management related event for which a network device generates Syslog event 300 can characterize a particular "type" of event. Special instruction 305 can tell the network management application an appropriate response for handling Syslog event 300, according to that type.

For instance, where the type of event is an alarm, the alarm and its basis and nature are conveyed by Syslog event 300, e.g., in text message 302. Special instruction 305 for that Syslog event can thus comprise semantics such as "type='Alarm'". In another instance, the type of event is a configuration change, the appearance, basis and nature conveyed in text message 302. Special instruction 305 for that Syslog event can thus comprise semantics such as "type='config_change'". It should be appreciated that none of these exemplary special instructions 305 are mutually exclusive, nor in one embodiment are any special instructions not discussed herein.

Further, several processing directives can be included for a single Syslog event 300. For example, a type related special instruction 305 providing notification of an alarm or a configuration change can also convey semantics related to expedited processing and/or 'Do not filter and maintain', such as to prevent any delay in processing the notification of the alarm/configuration change, and to tell the network management application that the information within Syslog event 300 should be kept and archived. Advantageously, an embodiment of the present invention thus provides for processing Syslog event 300 as a specially marked informational "packet," which can be convenient and reliable for network management applications.

One embodiment of the present invention provides for defining special characteristics to be protected from alteration through the network management functions (e.g., processing) when handling a Syslog event. These characteristics define semantic instructions intended to the processing layers above the network elements on how to process a given incoming event. In one embodiment, these characteristics provide information when a given Syslog event is not to be processed in a usual manner. In one embodiment, the Syslog event is defined according to current standards, procedures of specification, and the like. One embodiment of the present invention advantageously provides a mechanism with which business objectives, represented by the functioning of a network management system, can be harmonized with the performance objectives of the network devices that generate Syslog events.

Exemplary System

Figure 4:
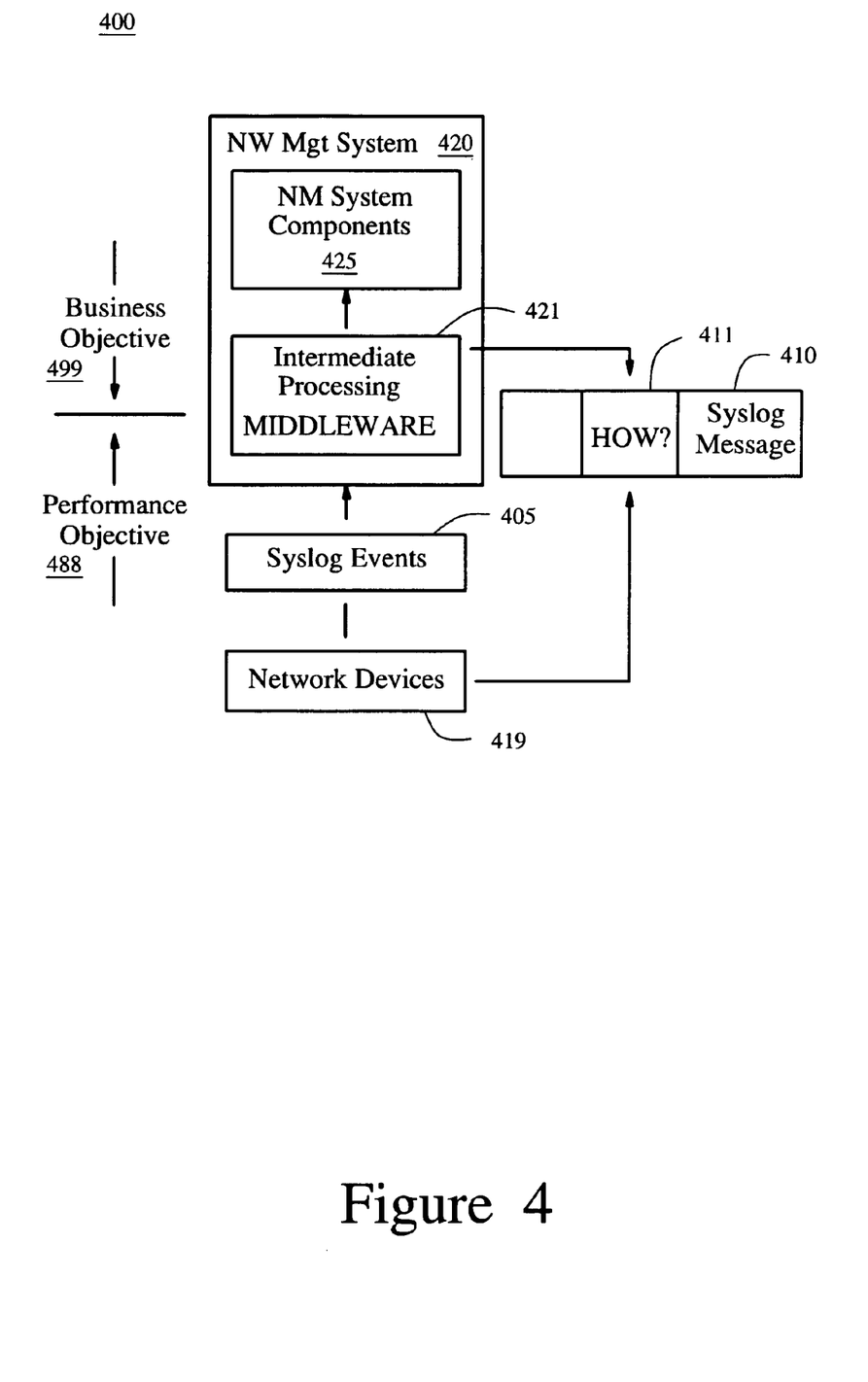
FIG. 4 depicts an exemplary network management environment, according to one embodiment of the present invention.

FIG. 4 depicts an exemplary network management environment 400, according to one embodiment of the present invention. Within network management environment 400, a network management system (NMS) 420 receives (e.g., accesses) Syslog events 405, which are generated by network devices 419 in response to actual events, and which may be numerous. The network devices thus comprise means for generating the Syslog events, as well as means, along with the network intercoupling them, for directing these Syslog events to the management entity. Syslog events 405 and their underlying actual events relate to a performance objective 488 significant to the operation of the network of which devices 419 are part. In one embodiment, NMS 420 comprises a network based computerized apparatus.

NMS 420 has intermediate processing middleware 421 and NMS components 425. NMS components 425 include network management applications, such as an Internet Operational Support System™ (OSS™). Processing Syslog events 405 by the NMS components 420 can be performed according to business objective 499.

However, in one embodiment of the present invention, a preprocessing directive 411 comprises a portion of Syslog event 410, which is one of Syslog events 405. Network devices 419 apply preprocessing directive 411 to inform NMS 420 that Syslog event 410 should be handled in some special way, e.g., relative to the other messages comprising Syslog events 405. In one embodiment, preprocessing directive 411 comprises a part of a Syslog event 410, such as a special preprocessing related field or a preprocessing related tag in text.

Middleware 421 provides intermediate processing by reading the preprocessing directive 411 and directing NMS components 425 to handle Syslog event 410 in a correspondingly appropriate manner. This provides discrimination at the intermediary processing layer 421, between Syslog event 410 that must be treated preferentially, e.g., simply being directly reported to a network operator, and those others of Syslog events 405, which have no special requirements.

Although the source of Syslog events 405 remains network devices 419, Syslog event 410 has indication within preprocessing directive 411 relating to preferential or other processing at another layer, such as the NMS components 425. Thus, NMS components 425 can receive indication from preprocessing directive middleware 421 of the criticality of a particular Syslog event to business objective 499, as well as performance objective 488. Thus, the layers of the management entity comprise means for interpreting the directive and means for handling the event message, such as with processing the event according to the directive.

In reality, even the conventional Syslog event format provides severity header fields with well defined values, e.g., from 0 to 7, which correspond to informal to outstanding. However, where an event storm occurs, releasing a flood of Syslog events, all corresponding to outstanding (e.g., Level 7) events and leading to outstanding alarms, it can be difficult, perhaps impossible to differentiate between individual Syslog events within the flood and properly instruct on a particular Syslog event or events belonging to a given severity class, all of which ought to be processed following special instructions.

For instance, Syslog events can have priority levels typically corresponding to those in Table 1, below. These priority levels can also be used in an embodiment of the present invention.

TABLE 1

| Level name | Level | Description | Syslog definition |
| --- | --- | --- | --- |
| Emergencies | 0 | System unusable | LOG_EMERG |
| Alerts | 1 | Immediate action required | LOG_ALERT |
| Critical | 2 | Critical conditions | LOG_CRIT |
| Errors | 3 | Error conditions | LOG_ERR |
| Warnings | 4 | Warning conditions | LOG_WARNING |
| Notifications | 5 | Normal but significant conditions | LOG_NOTICE |
| Informational | 6 | Informational messages only | LOG_INFO |
| Debugging | 7 | Debugging messages | LOG_DEBUG |

Some of network devices 419 use a local facility, such as 'local7'. In one embodiment, this can be changed using an appropriate command, such as a 'logging facility facility-type global' command in IOS™, or the 'set logging' or 'set logging server' facility Catalyst™ commands, or another command.

The severity of the Syslog events 405 is hard coded into the events themselves. Delivery of Syslog events 405 can be controlled via the 'logging history level' IOS command or the 'set logging level' or 'set logging server severity' Catalyst commands. Thus, all events 405 of equal or higher severity are delivered. Despite the flood of Syslog events pouring forth from an event storm, processing delays and information loss are prevented by an embodiment of the present invention.

Further, although some of Syslog events 405, perhaps including Syslog event 410, may have relatively low severity levels, their expected direct delivery to central management applications 425 may still be significant, such as for audits or other administrative purposes, perhaps even mission critical purposes not yet identified (e.g., or captured during design of a platform or device). An embodiment of the present invention helps prevent delivery delays and or information loss therefrom.

One embodiment of the present invention differentiates between some of Syslog events 405 such as Syslog event 410 and others, though all may display the same severity in the flood of Syslog events accompanying the event storm under discussion. In the present embodiment, allows Syslog event 410, though may have a relatively low severity, to be differentiated from other Syslog events 405 on the basis of some other significant characteristic. The Syslog event 410 so differentiated is effectively shielded from inadvertent delay and information loss therefrom.

Referring gain to FIG. 3, in one embodiment, special instruction 305 provides a preprocessing directive conveyance mechanism for applying particular embedded instructions. Such embedded instructions are implanted into the event semantic of special instruction 305 by its nature and from its initial inception, e.g., when it is defined by its designers. Thus, enhancements in defining and processing Syslog events 300 are allowed in one embodiment, using the preprocessing directives, field 301 and tag 303. Such embedded special instructions 305 include the 'fast_track' instruction, discussed above. Other embedded special instructions 305 include 'keep_informal' and 'cancellation_type'.

For an event that does not represent significant information, for instance from the perspective of network management, it may be decided during design that it is not worth expending computing resources to process it in certain ways, such as converting it into an SNMP notification. With reference to both FIGS. 3 and 4, where preprocessing directive 411 bears a 'keep_informal' special instruction 305, semantics inherent therein that are read by middleware 421 effectively tell the NMS components 425 (or e.g., other higher event processing layers) that there is no need to send an SNMP trap on this event. This can be useful where events of this type are counted, such as for triggering a more significant event, for instance upon a given counter threshold being reached or exceeded.

Where the events being counted correspond to a relatively minor but somewhat persistent problem, reaching or crossing the counting threshold can signify a pattern of persistence, yet still of a minor problem. Such events are counted, but conversion is typically not performed. Additionally, it may be desirable to store such events; for example, they may be relevant for a subsequent audit. In one embodiment, such special information 305 comprises read-only information. In one embodiment, such read-only special information 305 comprises Boolean information.

In contrast, a particular Syslog event 410 may represent an originally intended condition to be reported as a notification with no alteration at all. These kinds of events can correspond for instance to special types of events that report a status of a particular one of network devices 119. This Syslog event 410 may be intended for processing by a particular layer above the device layer, for instance by a particular network management application of NMS components 425.

Alternatively, for this Syslog event 410, it may be intended to limit the delay in conveying outstanding information on a catastrophic cause, for instance by skipping any intermediate processing by middleware 421, apart from reading the preprocessing directive 411. The preprocessing directive 411 'fast_track' indicates that its Syslog event 410 is to follow a pass-through path until it reaches the destination, which can be embedded into the message text (text 302), or decided by the NMS components 425 processing it. In one embodiment, the 'fast_track' preprocessing directive 411 comprises read-only information; in one such embodiment, preprocessing directive 411 comprises Boolean information.

Where Syslog event 410 carries a particular preprocessing directive 411 relating to skipping certain management operations such as aggregation and translation to SNMP notifications, a risk may arise of accumulating many Syslog events in their raw form. One embodiment of the present invention provides for cancellation, e.g., for efficiently handling Syslog event 410 with such a preprocessing directive 411, where it is under a time constraint.

The semantic of the preprocessing directive 411 'cancellation_type' specifies either the original intention to have the event automatically cancelled after a duration set by the source device 419, or a minimal duration to be kept unaltered and unprocessed, specified by some criterion significant to the design of the device. This can help capture data significant to the design of the network devices 419 and help avoid wrong cancellation modes. In an alternative embodiment, cancellation can be driven by default, by a processing entity of NMS 420 following business rules. Values comprising field 301 in the alternative embodiment comprise read only data.

Certain of Syslog events 405 may be temporary stored for correlation with others, such as when a complex (e.g., correlated, translated, etc.) event is triggered by upper layers of NMS 420. In contrast, certain other of Syslog events 405 may specify (e.g., explicitly) that an SNMP notification is to be triggered when a minimal duration is reached. In one embodiment, some events are automatically cleared after a given period of time. This can be advantageous where there is a limited capacity to store events on a long term basis.

For a special event represented by Syslog event 410, a source device 419 can call for manual cancellation. In one embodiment, information is captured in a separate Syslog field such as derived from a parent field 301. In an alternative embodiment, information is specified in the message part 302 under a defined tag 303. The alternative embodiment is especially advantageous where it is desirable to avoid adding to an existing Syslog field 301.

In one embodiment, the preprocessing directive 411 provides a mechanism useful to a network management system for preferentially processing a Syslog event 410 from amongst a plurality of Syslog events 405. Instructions (e.g., special instructions 305) relating to this directive, conveyed with semantically define special labels (field 301 and tags 303) allow appropriate processing based on their indication of a particular event instance. For example, the semantics 'keep_informal', 'fast_track', and 'cancellation_type' allow preferential processing for a Syslog event based on such event instance indication. One embodiment functions without parsing Syslog events 411, advantageously thus speeding their processing.

FIG. 5 depicts an exemplary preprocessing directive header field 500, according to one embodiment of the present invention. Header field 500 allow preferential processing for a Syslog event without parsing text of its Syslog event. Header field 500 has a two Boolean subfields 501 and 502 and a string subfield 503. The values zero and one are used in the Booleans subfield 501 and 502 in the present embodiment.

For Boolean subfield 501, a value of one conveys semantics for "keep_informal"; a value of zero conveying contrary semantics. For Boolean subfield 502, a value of one conveys semantics for "fast_track"; a value of zero conveying contrary semantics. The string subfield 503 can have different values. Examples of such values for string subfield 503 include: "none", "every_x_minutes" (where 'x' is variable), "every_<day_of_the_week>|<months&date_of_the_year>", and "under command".

The semantics conveyed with "under_command" convey that a special cancellation command is to be used for clearing a particular event. The semantics conveyed with "none" convey that cancellation is not directed. The semantics conveyed with the exemplary time related values convey information related to cancellation timing.

In an alternative embodiment, three tags define semantics corresponding to those conveyed with subfields 501-503, each however with a respective label within the message side of the Syslog event. This alternative has the advantage of ease of implementation. However, this advantage may be achieved at the expense of using processing resources and extending the time for processing the event. These expenses may accrue to parsing performed to glean the semantics conveyed by the text based tags.

Referring again to FIG. 4 as well, middleware 421 (and e.g., higher NMS components 425) can, in one embodiment, simply ignore these instructions, e.g., within Boolean fields 501 and 502. Where a particular NMS 420 functions to so ignore the instructions, an audit function can reflect that the instructions were conveyed to that NMS. Advantageously, the present embodiment allows an audit function to determine that the NMS entity 420 is responsible for ignoring an original event instruction. In this embodiment therefore, the exemplary instructions 'keep_informal' and 'fast_track' are effectively prevented from being overwritten; they can however be neglected.

Where a Syslog event is labeled with a preprocessing directive according to an embodiment of the present invention, a processing entity can handle them appropriately, such as to reflect the significance of the underlying device activity they report. Such processing entities can include, but are not limited to, a clustered network server (CNS) notification engine (CNOTE), a network element management system (EMS), and an Internet OSS™.

In one embodiment, a processing entity (e.g., NMS 420) processes a Syslog event according to the following rules. Where the 'keep_informal' Boolean subfield 501 for an incoming event is set to '1', a count is incremented with each such event, such that it eventually counts a total of such events. No conversions or other advanced processing is required. A NMS component 425 provides a policy that can trigger a particular alarm when the number of such events exceeds a given threshold. Where the 'fast_track' Boolean subfield 502 is set to one, the incoming event is considered a 'pass_through' event, which is effectively delivered to its destination without further processing.

Where the 'cancellation_type' string subfield 503 has a value different than "none", the processing entity proceeds as instructed by the value of the field. Semantically, the values in one embodiment are customizable. This allows for controlling outage related issues with respect to the business objective 499. The 'cancellation_type' string subfield 503 advantageously helps handle different classes of Syslog events according to the causes they are reporting.

In one embodiment, a Syslog event has all the three subfields 501-503 (or e.g., multiple subfields thereof) carrying a combined semantic. Advantageously, subfields 501, 502, and 503 do not conflict one with another. Thus, a Syslog event may have semantics simultaneously conveying 'keep_informal', on the 'fast_track', and having particular cancellation logic.

Figure 6:
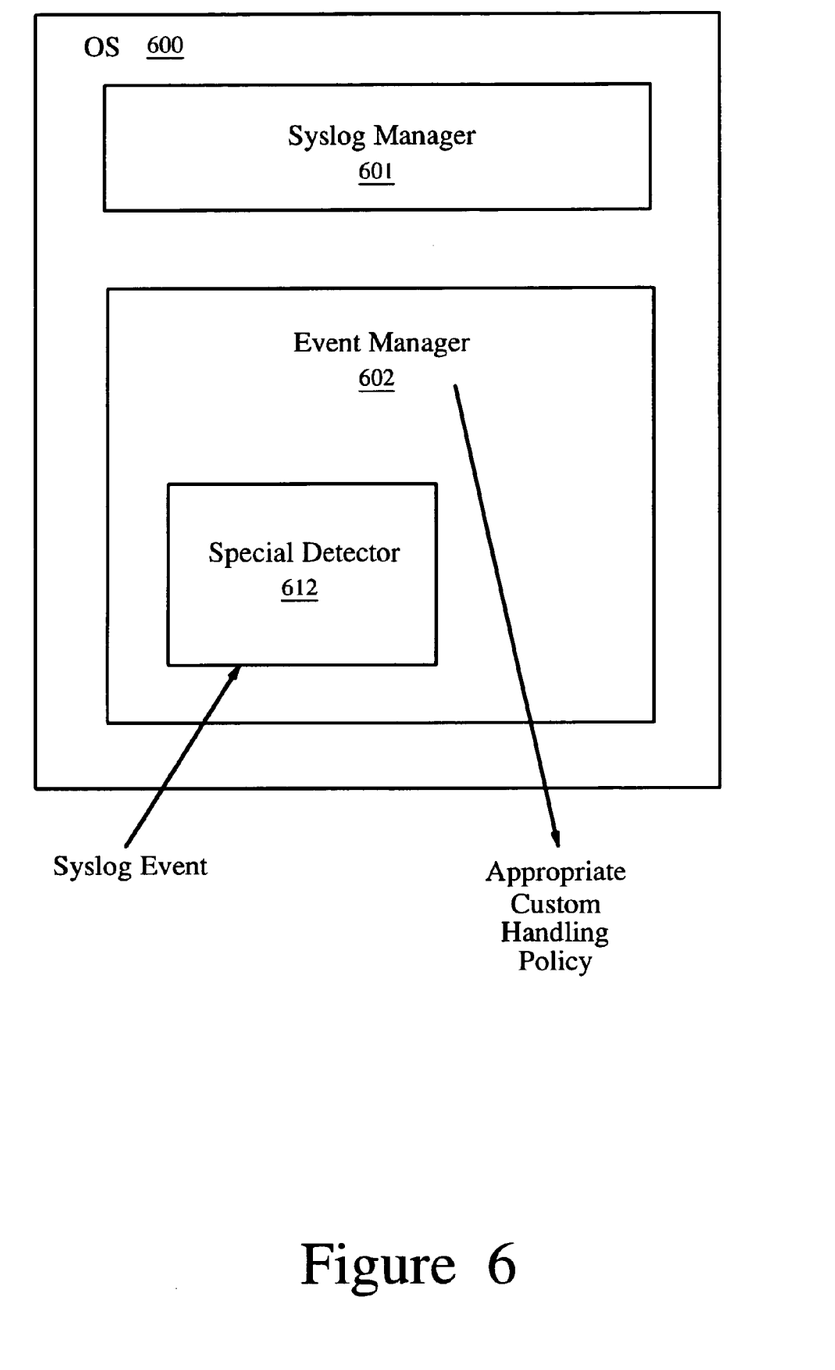
FIG. 6 depicts an exemplary operating system, according to one embodiment of the present invention.

FIG. 6 depicts an exemplary operating system (OS) 600, according to one embodiment of the present invention. In one embodiment, OS 600 comprises IOS™. OS 600 has an embedded Syslog manager 601 and an embedded event manager 602. Event manager 602 comprises a thread of OS 600. Event manager 602 has a special detector 612, which detects and reads preprocessing directives, and generates an appropriate custom policy 611.

Referring again to FIG. 2, in one embodiment, the function of preprocessing directive reader 2505 corresponds in one embodiment to the function of special detector 612. In one embodiment, special detector 612 provides for appropriate processing for a Syslog event based on a preprocessing directive. Syslog manager 601 handles Syslog events based on the appropriate corresponding custom policy 611. For instance, a customizable policy can be defined, triggered by the embedded event manager 602, to set the type of cancellation.

In one embodiment applied with a CNS policy-based agent such as C-NOTE™, PerfEngine™, a preprocessing directive reader 2505 therein considers these extensions and could process the Syslog event accordingly. Syslog events 410 can be subject to de-duplication and correlation, which can alter the semantics discussed above. However, the information provided to the EMS 420 by the preprocessing directive 411 allows distinctions among classes of Syslog events 405, thus allowing Syslog event 410 to be distinguished therefrom.

While various embodiments are discussed herein with reference to IOS™ and other exemplary, specific commercially available networking systems, programs, platforms, and devices, this is for purposes of description. Embodiments of the present invention are well suited to function with such a variety of different systems, programs, platforms, and devices. Further, while embodiments are discussed herein with reference to Syslog events, it should be appreciated by those skilled in the art that an embodiment thereof is well suited to function with another kind of event or message type, e.g., different from Syslog events.

An embodiment of the present invention can be useful in helping to achieve Consistent Network Element Manageability (CNEM). In one embodiment, CNS-NOTE™ (CNS Notification Engine™) mechanisms are adapted to support these features when translating Syslog events to SNMP notifications. In one embodiment, a CNS Performance Engine™ (CNS PerfEng™) uses these features for adapting aggregation functions. In one embodiment, preprocessing directive reader 2505 functions as a Remote Syslog Analyzer and Collector (RSAC).

Referring again to FIG. 4, Syslog events can be processed in one embodiment with lower layers of NMS 420 components, such as middleware 421, or by other components 425. In one embodiment, multiple mechanisms can handle Syslog events according to preprocessing directives. These multiple mechanisms can function at different levels.

The present embodiment allows a significant saving of computational resources, and minimizes delay for certain types of Syslog events, while helping maintain accuracy of the information sent therein to its destination. This helps avoid information distortion that can accompany processing related transformations.

Exemplary Processes

Figure 7:
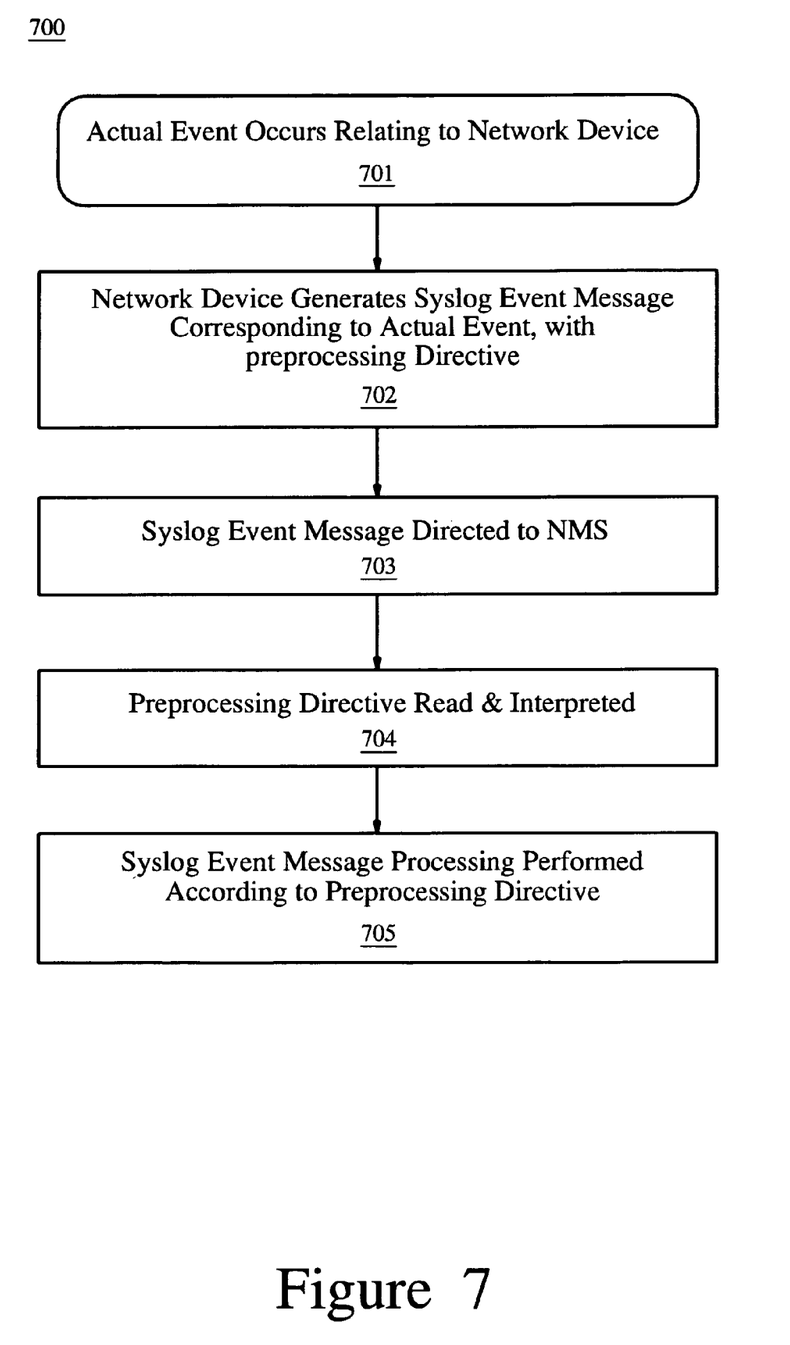
FIG. 7 is a flowchart of an exemplary computer implemented process for processing a Syslog event, according to one embodiment of the present invention.

FIG. 7 is a flowchart of an exemplary computer implemented process 700 for processing a Syslog event, according to one embodiment of the present invention. Process 700 begins with step 701, wherein an occurrence has transpired relating to a network device.

In step 702, the network device generates a Syslog event corresponding to the actual status, wherein a preprocessing directive, appropriate to the actual event, is applied to the Syslog event. The preprocessing directive is applied, for instance within a header field or a tag in a text portion (message) of the Syslog event.

In step 703, the Syslog event is directed to a network management system or another entity. In step 704, the network management system reads and interprets the preprocessing directive. In step 705, the Syslog event processing is performed according to the preprocessing directive, completing process 700. In one embodiment, process 700 can be extended for performing a variety of functions related to network management, such as billing for network services.

Figure 8:
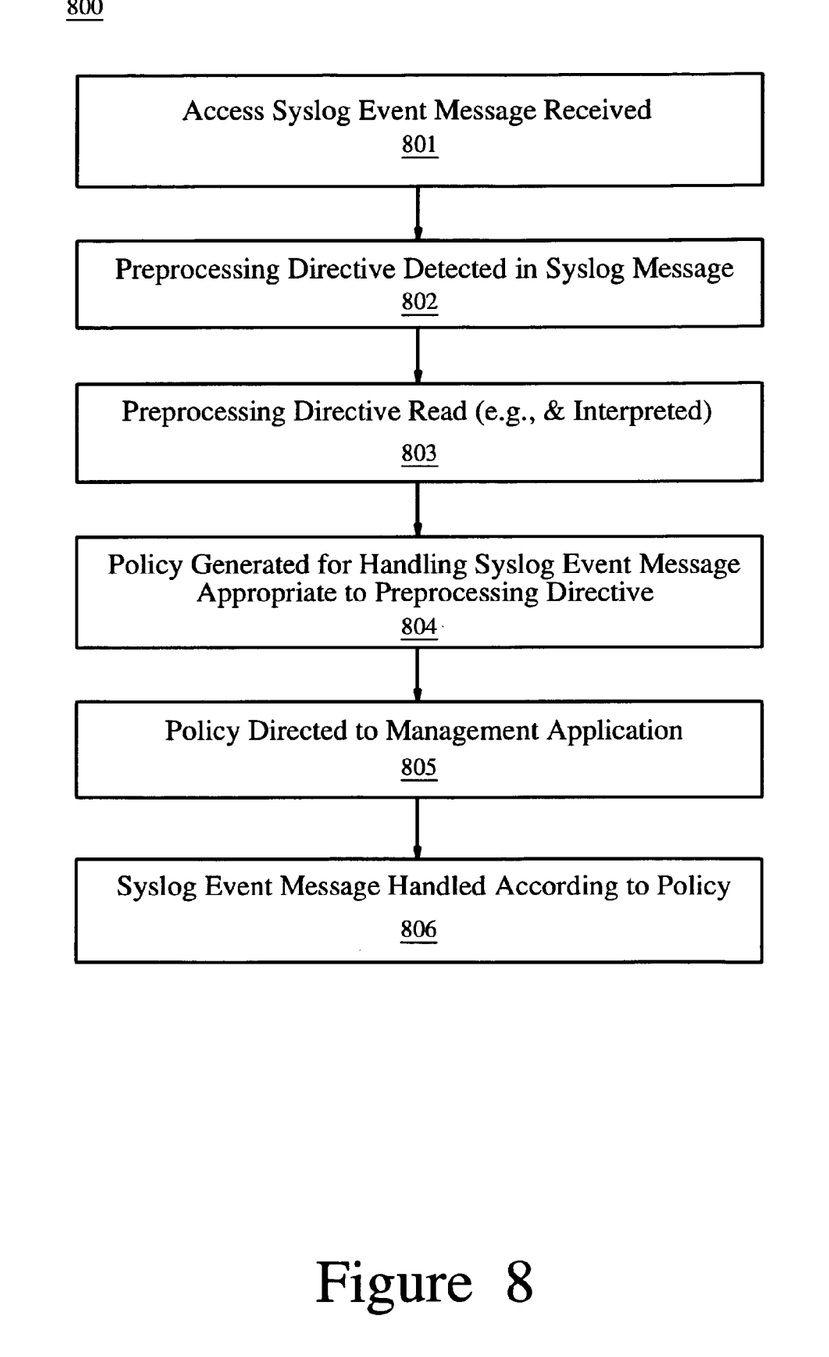
FIG. 8 is a flowchart of an exemplary computer implemented process for managerial handling of a Syslog event, according to one embodiment of the present invention.

FIG. 8 is a flowchart of an exemplary computer implemented process 800 for managerial handling of a Syslog event, according to one embodiment of the present invention. Process 800 begins with step 801, wherein a Syslog event is accessed, e.g., upon receipt, with a management system.

In step 802, a preprocessing directive is detected within the Syslog event event. In step 803, the preprocessing directive is read (e.g., and interpreted). In step 804, an appropriate policy for handling the Syslog event corresponding to the preprocessing directive is generated.

In step 805, the policy generated is directed to a management application. In step 806, the Syslog event is handled, e.g. by the management application, in accordance with the policy generated. Upon so handling the Syslog event, process 800 is complete.

In summary, a method and a system direct processing related handling for an event. The method includes generating the event message upon occurrence of an event relating to a device, such as a network device. The device related event has a characteristic. A directive, appropriate to this characteristic, is included with the event itself. The event is directed to a management entity, which interprets the directive and handles the event message by processing it according to the directive.

A method and system for directing processing related handling for an event message are thus described. While the present invention has been described in particular embodiments, it should be appreciated that the present invention should not be construed as limited by such embodiments, but rather construed according to the following claims and their equivalents.

What is claimed is:

1. A system comprising:
a network managing device to receive one or more event messages from at least one network device, wherein each event message includes a directive having embedded instructions to indicate a type of processing to be performed on the event messages and to direct the network managing device to process the event messages with the type of processing indicated in the directive, wherein the directive and corresponding embedded instructions are defined by the at least one network device based on an importance level associated with each event message relative to other event messages capable of being received by the network managing device, and wherein, when at least one of the directives indicates the corresponding event message includes critical information regarding the operation of the network device, the directive and corresponding embedded instructions are configured to direct the network managing device to expedite handling of the at least one event message by sending one or more control messages that reroute traffic through a network away from the network device corresponding to the critical information in the event message and configured to store a full version of the at least one event message for a predetermined time.

2. The system as recited in claim 1, wherein the event message further comprises a System Log event message.

3. The system as recited in claim 1, wherein the at least one network managing device comprises:
a directive interpreter configured to read the directive and apply a policy for processing the corresponding event message, wherein the policy comprises an action corresponding to a characteristic of the event, and wherein the directive interpreter is configured to execute an automatic cancellation of processing relating to the event message; and
an application, wherein the directive interpreter is configured to direct the policy to the application, and wherein the application is configured to process the event message according to the policy.

4. The system as recited in claim 3, wherein the directive interpreter is configured to generate the policy, wherein the policy is based at least in part on business objectives of the at least one network management entity.

5. The system as recited in claim 1, wherein the event message further comprises a header field and a body portion.

6. The system as recited in claim 5, wherein the header field includes a plurality of subfields, wherein the plurality of subfields comprises: one or more Boolean subfields, one or more string subfields, or combinations thereof.

7. The system as recited in claim 1, wherein the event message further comprises information relating to a classification of the event according to type, event criticality, direction of the event message to a specific network management entity, or combinations thereof, and wherein the event message is processed through an application of a policy to the event message according to the information.

8. A system comprising:
a network device to generate an event message in response to an occurrence of an event relating to the network device, wherein the event message includes a directive having embedded instructions to explicitly indicate a type of processing to be performed on the event message and to direct a network managing device to process the event message with the type of processing indicated in the directive, wherein the network device is configured to define the directive and corresponding embedded instructions based on an importance level associated with the event message relative to other event messages capable of being received by the network managing device, and wherein, when at least one of the directives indicates the corresponding event message includes critical information regarding the operation of the network device, the directive and corresponding embedded instructions are configured to direct the network managing device to expedite handling of the event message, to reroute traffic through a network away from the network device corresponding to the critical information in the event message, and to store a full version of the event message for a predetermined time.

9. A computer-readable memory device storing instructions configured to cause at least one device to perform operations comprising:
detecting an event message, received from a network device, includes a directive for handling an event, wherein the directive includes instructions to indicate a type of processing to be performed on the event message, and wherein the directive and corresponding instructions are defined by the network device based on an importance level associated with the event message relative to other event messages capable of being received by a network managing device; and
processing the event message according to the type of processing indicated in the directive, when the directive indicates the event message includes critical information regarding the operation of the network device, the directive and corresponding instructions are configured to direct the network managing device to expedite handling of the event message, to reroute traffic through a network away from the network device corresponding to the critical information in the event message, and to store a full version of the event message for a predetermined time.

10. The system as recited in claim 7, wherein the policy applied by the specific network management entity is configured to produce alarms related to event messages, store event messages to storage media, pass-through event messages to another network management entity, fast-track event messages, aggregate event message information, hold event messages in buffer for a predetermined time, abstract event message information, filter event message information, cancel event messages, or combinations thereof.

11. The system as recited in claim 5, wherein the directive is located in a tag of the body portion, and wherein the at least one network managing entity is further configured to parse the tag from the body portion of the event message.

12. The system as recited in claim 7, wherein the information relating to the classification is located in a header field of the event message.

13. The system as recited in claim 7, wherein the information relating to the classification is located in a body portion of the event message.

14. The computer-readable memory device recited in claim 9, wherein the instructions are configured to cause the at least one device to perform operations further comprising:
    selecting a policy appropriate to the event; and
    processing the event by applying the policy to the event.

15. A method comprising:
    generating, with a network device, an event message in response to an occurrence of an event relating to the network device, wherein the event message includes a directive having embedded instructions to indicate a type of processing to be performed on the event message and to direct a network managing device to process the event message according to the type of processing indicated in the directive, wherein the network device is configured to define the directive and corresponding embedded instructions based on an importance level associated with the event message relative to other event messages capable of being received by the network managing device; and
    sending, with the network device, the event message to the network management device for processing according to the directive, and wherein, when the directive indicates the event message includes critical information regarding the operation of the network device, the directive and corresponding embedded instructions are configured to direct the network managing device to expedite handling of the event message, to reroute traffic through a network away from the network device corresponding to the critical information in the event message, and to store a full version of the event message for a predetermined time.

16. The method as recited in claim 15, wherein the directive further comprises information relating to a classification of the event according to event criticality, direction of the event message to a specific network management entity, or combinations thereof, and wherein the event message is configured to be processed through an application of a policy to the event message according to the directive information.

17. A method comprising:
    receiving, with a network managing device, an event message from a network device, wherein the event message relates to an event that occurred on the network device and includes a directive for resolving the event, wherein the directive includes embedded instructions to indicate a type of processing to be performed on the event message, wherein the directive and corresponding embedded instructions are defined by the network device and based on an importance level associated with event message relative to other event messages capable of being received by the network managing device; and
    processing, with the network managing device, the event message as directed by the directive and according to the type of processing indicated in the directive, wherein, when the directive indicates the event message includes critical information regarding the operation of the network device, the directive and corresponding embedded instructions are configured to direct the network managing device to expedite handling of the event message by sending one or more control messages that reroute traffic through a network away from the network device corresponding to the critical information in the event message and configured to store a full version of the event message for a predetermined time.

18. The method recited in claim 17, further comprising:
    reading the directive;
    applying a policy for processing the event message, wherein the policy comprises an action corresponding to a characteristic of the event; and
    forwarding the event message, along with the policy, to an application, wherein the application is configured to process the event according to the policy.

19. A network managing device comprising:
    means for receiving an event message from a network device, wherein the event message relates to an event that occurred on the network device and includes a directive for resolving the event, wherein the directive includes embedded instructions to explicitly indicate a type of processing to be performed on the event message, wherein the directive and corresponding embedded instructions are defined by the network device and based on an importance level associated with event message relative to other event messages capable of being received by the network managing device; and
    means for processing the event message as directed by the directive and according to the type of processing indicated in the directive, wherein, when the directive indicates the event message includes critical information regarding the operation of the network device, the directive and corresponding embedded instructions are configured to direct the network managing device to expedite handling of the event message by sending one or more control messages that reroute traffic through a network away from the network device corresponding to the critical information in the event message and configured to store a full version of the event message for a predetermined time.

20. The network managing device recited in claim 19, further comprising:
    means for applying a policy to the event; and
    means for displaying the event message on a monitor device.

21. The network managing device recited in claim 20, further comprising:
    means for generating the policy for the event; and
    means for storing the policy.

* * * * *